3,155,651
PROCESS FOR THE PRODUCTION OF N,N'-TETRA-SUBSTITUTED 3-AMINO-2-AZAPROP-2-EN-1-YLIDENE AMMONIUM HALIDES
Heinrich Gold, Cologne-Stammheim, Germany, assignor to Farbenfabriken Bayer Aktiengesellschaft, Leverkusen, Germany, a corporation of Germany
No Drawing. Filed Dec. 6, 1960, Ser. No. 73,963
Claims priority, application Germany Dec. 19, 1959
12 Claims. (Cl. 260—240)

This invention relates to a process for the production of N,N'-tetrasubstituted 3-amino-2-azaprop-2-en-1-ylidene ammonium halides and also addition compounds of 1 mol of cyanuric chloride and 2 mols of secondary N-formylamine.

It is an object of the present invention to provide hitherto unknown N,N-tetrasubstituted 3-amino-2-azaprop-2-en-1-ylidene ammonium halides and addition compounds of 1 mol of cyanuric chloride and 2 mols of secondary formylamine. Another object of the invention is to provide a process for the production of these compounds, which can be carried out in a simple manner and which leads to high yields. Other objects will be apparent from the following description and from the examples.

It has surprisingly been found that N,N'-tetrasubstituted 3-amino-2-azaprop-2-en-1-ylidene ammonium halides are obtained if 1 mol of cyanuric halide is reacted with at least approximately 6 mols of a secondary N-formylamine at a temperature of from 0 to 180° C., if desired in the presence of an inert solvent.

The reaction according to the invention is entirely novel and surprising and there are also no references to similar reactions in the existing literature.

The course of the reaction is shown in the following formula diagram, cyanuric chloride and dimethyl formamide being used as starting materials:

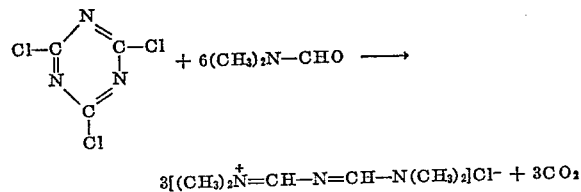

$$3[(CH_3)_2\overset{+}{N}=CH-N=CH-N(CH_3)_2]Cl^- + 3CO_2$$

Suitable secondary N-formylamines for employment in the process according to the present invention are the N-formyl derivatives of secondary amines which contain as substituents lower aliphatic, cycloaliphatic, phenyl alkyl or phenyl radicals, which radicals may themselves be substituted by alkoxy or hydroxy groups or by halogen atoms. It is also possible to use the N-formyl derivatives of carbocyclic and heterocyclic secondary amines.

Especially suitable are the N-formyl derivatives of dimethylamine, diethylamine, diisopropylamine, diethanolamine, ethylcyclohexylamine, methyl benzylamine, N-methylaniline, N-methyl-p-chloraniline, N-methyl-p-anisidine, pyrrolidine, piperidine, morpholine and thiomorpholine.

Of the cyanuric halides, cyanuric chloride and cyanuric bromide are particularly preferred.

Halogenated hydrocarbons such as ethylene chloride and tetrachloroethane can be used as solvents in the process according to the present invention.

The reaction is effected at a temperature of from 0° C. to 180° C., and preferably at a temperature of from 40° C. to 100° C.

In carrying out the reaction, 1 mol of cyanuric halide is mixed with at least 6 mols of N-formylamine. A solvent may then be added for dilution purposes or alternatively the individual reaction components may be combined in solution. Instead of the aforementioned solvents it is possible to employ an excess of the secondary N-formylamine. The reaction generally proceeds exothermally. The desired temperature within the range 0° C. to 180° C. can be adjusted and maintained either by cooling or, in the case of reactants which react only with difficulty, by heating. The reaction should be so carried out that a uniform and not too strong stream of carbon dioxide is formed.

The completion of the reaction is recognised from the subsidence of the evolution of carbon dioxide. The reaction is complete after the evolution of three mols of carbon dioxide.

The final product is usually obtained directly in crystalline form. When working in the presence of diluents, it is thus advisable to employ fairly high concentrations of the reactants so that the final product is obtained in solid form.

Working up can be effected in the usual manner, preferably by adding a precipitant, such as acetone, ether, dioxane or tetrahydrofuran to the reaction mixture and filtering off the precipitate with suction.

One particular form of the process according to the invention consists of a two-stage working method.

If the reaction is carried out at relatively low temperatures of for example from 0 to 10° C., an addition compound of 1 mol of cyanuric halide and 2 mols of secondary N-formylamine generally first of all precipitates out.

It is consequently to be assumed that the reaction according to the invention always proceeds by way of an intermediate compound which is, however, so unstable that it reacts directly at higher temperatures with the secondary N-formylamine which is still present to give the corresponding N,N'-tetrasubstituted 3-amino-2-azaprop-2-en-1-ylidene ammonium halide.

This two-stage reaction conforms to the following formula diagram when cyanuric chloride and dimethyl formamide are employed as starting materials:

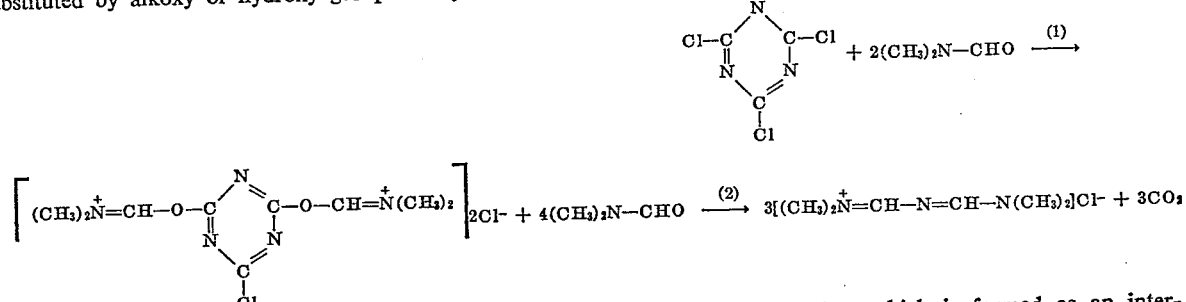

The addition product which is formed as an intermediate can be isolated without any difficulty by working at suitably low temperatures. In this first reaction step, there are in principle only required initially two mols of secondary N-formylamine per mol of cyanuric chloride. An excess is, however, generally not harmful and a further reaction of the final products according to the invention only occurs at somewhat elevated temperature.

If the addition product is isolated, 4 mols of secondary N-formylamine are in principle sufficient for carrying out the second stage, but an excess is generally advantageous.

If the two-stage method is chosen, it is also possible to produce 3-amino-2-azaprop-2-en-1-ylidene ammonium halides which carry different substituents on the 2-aminonitrogen atoms. In this case, a secondary N-formylamine different from that of the first stage is used in the second stage. In this case 1 mol of a symmetrically substituted 3-amino-2-azaprop-2-en-1-ylidene ammonium halide is obtained from 1 mol of cyanuric halide as well as 2 mols of such a halide which is unsymmetrically substituted.

The N,N' - tetrasubstituted 3-amino-2-azaprop-2-en-1-ylidene ammonium halides obtained by the process according to the present invention have not so far been described in the literature. They are valuable intermediate products for the manufacture of insecticides and auxiliaries for the manufacture and processing of plastics.

Some of the secondary N-formylamines employed in the process according to the present invention are also novel compounds but they can be prepared from the corresponding secondary amines by conventional methods, for example by heating the secondary amine with methyl formate in a closed reaction vessel for several hours at a temperature of from 120° C. to 140° C.

In order that the invention may be more clearly understood the following examples are given by way of illustration only:

EXAMPLE 1

300 parts by weight of dimethyl formamide are poured on to 92 parts by weight of cyanuric chloride and the resulting solution is left to stand at room temperature. The reaction starts after 10 minutes. The commencement of the reaction can be recognised from a rise in temperature and by the evolution of carbon dioxide. When the temperature has reached 50–60° C., this temperature is maintained by occasional cooling with iced water until the evolution of carbon dioxide, which becomes violent, has subsided. The reaction is practically complete after about 1½ hours. During this time, a precipitate is temporarily deposited but this dissolves again as the reaction proceeds. 3-dimethylamino-2-azaprop-2-en-1-ylidene dimethyl ammonium chloride separates out in the form of large crystals when the reaction is complete. 500 parts by volume of acetone are then added and the product is suction-filtered at room temperature and washed with acetone. The product is dried in a desiccator. The yield is 213 parts by weight, this corresponding to 87% of the theoretical. The salt crystallises in the form of large prisms from dimethyl formamide and melts at 101–103° C.

*3-Dimethylamino-2-Azaprop-2-En-1-Ylidene Dimethyl Ammonium Chloride*

87.6 parts by weight of dimethyl formamide, 80 parts by volume of benzene and 36.9 parts by weight of cyanuric chloride are stirred together and the resulting solution is heated for 2 hours at 70–80° C. 10000 parts by volume of carbon dioxide are evolved. On cooling, the salt crystallises in the form of long needles having a melting point of 98–100° C. The yield is 83 parts by weight, i.e. 85% of the theoretical. The picrate melts at 137° C.

9500 parts by volume of carbon dioxide are evolved if the reaction is carried out in ethylene chloride at 80° C. instead of in benzene. After cooling, 70 parts by weight of the salt crystallise out. The salt has a melting point of 103° C.

EXAMPLE 2

92 parts by weight of cyanuric chloride are dissolved in 424 parts by weight of formyl methyl aniline and the solution is slowly heated. Evolution of carbon dioxide starts at 70–80° C. The temperature is maintained at 100° C. until the initial violent evolution of gas has ceased, whereupon the temperature is maintained at 115° C. for 2 hours. During this time, 34000 parts by volume of carbon dioxide have been evolved. The partially crystalline product is mixed with 300 parts by weight of acetone at 30° C., filtered with suction and washed with acetone. 180 parts by weight of 3-methyl-phenylamino-2-azaprop-2-en-1-ylidene methyl phenyl ammonium chloride are obtained in the form of yellowish lamellae having a melting point 204° C. The product shows a blue fluorescence under an ultra-violet lamp. The yield is 42% of the theoretical.

*3-Methyl-Phenylamino-2-Azaprop-2-En-1-Ylidene Methyl Phenyl Ammonium Chloride*

162 parts by weight of N-formyl methylaniline, 100 parts by volume of chlorobenzene and 36.9 parts by weight of cyanuric chloride are mixed together and the resulting solution is heated to 115° C. Evolution of carbon dioxide starts at 80° C. Crystallisation commences when 8000 parts by volume of carbon dioxide have been evolved. The temperature is maintained at 110° C. for 4 hours and is then lowered to room temperature. The crystals are separated from the mother liquor and washed with acetone. After drying, there are obtained 60 parts by weight of the salt. The yield is 42% of the theoretical.

EXAMPLE 3

92 parts by weight of cyanuric chloride are dissolved in 300 parts by weight of dimethyl formamide and the resulting solution is stirred for 6 hours at 5–10° C. Crystallisation commences after 30 minutes. The thick crystal magma is diluted with 300 parts by weight of cold dioxane, filtered with suction and then washed on the filter with 200 parts of dioxane. The crystal magma is finally washed three times with absolute ether, using 200 parts by weight on each occasion. After drying in a vacuum desiccator over carbon and caustic soda, there are obtained 160 parts by weight of an addition product of 1 mol of cyanuric chloride and 2 mols of dimethyl formamide. The addition product does not melt without decomposition. Yield: 97% of the theoretical.

$C_9H_{14}Cl_3N_5O_2$ (330.53), calc.: 32.7% C, 4.3% H, 32.3% Cl, 21.2% N, 9.7% O. Found: 32.0% C, 4.6% H, 30.5% Cl, 18.4% N, 13.6% O.

126 parts by weight of the addition compound thus prepared are stirred into 150 parts by weight of dimethyl formamide and the resulting mixture is heated at 80° C. until 18000 parts by volume of carbon dioxide have been evolved. After dilution with acetone and isolation as described in Example 1, 135 parts by weight of 3-dimethylamino-2-azaprop-2-en - 1 - ylidene dimethyl ammonium chloride having a melting point of 101–103° C. are obtained. The yield is 71% of the theoretical. The picrate obtained from an alcoholic solution melts at 136° C.

If 40.3 parts by weight of the aforementioned addition compound are stirred with 120 parts by weight of formyl methylaniline and the mixture is heated to 90° C., a thick syrup is formed in an exothermic reaction, as well as 10,000 parts by volume of carbon dioxide. The temperature of the reaction mixture may rise to 150° C. if the reaction mixture is not cooled. The resulting thick syrup is diluted with acetone, whereby 50 parts of a salt mixture melting at 120–150° C. are obtained. The salt mixture consists of 3-methylphenylamino-2-azaprop-2-en-1-ylidene methyl phenyl ammonium chloride having a melting point of 204° C. and of 3-dimethylamino-2-azaprop-2-en-1-ylidene-methylphenyl-ammoniumchloride.

EXAMPLE 4

3-Diethylamino-2-Azaprop-2-En-1-Ylidene Diethyl Ammonium Chloride

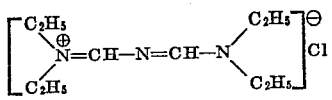

18.4 parts by weight of cyanuric chloride are dissolved in 80.8 parts by weight of diethyl formamide. Evolution of carbon dioxide starts after heating to 70° C. The evolution of carbon dioxide becomes violent when the temperature reaches 90° C., the reaction being exothermic. By the time the temperature has reached 115° C., 5000 parts by volume of carbon dioxide have been evolved. The solution is maintained at a temperature of 120° C. for 1 hour and left to stand overnight at 20° C. The resulting thick crystal magma is diluted with benzene, suction-filtered and washed with benzene on the filter. Yield: 50 parts by weight, i.e. 76% of the theoretical.

The product is obtained in the form of hygroscopic crystals having a melting point of 94° C. after recrystallisation from 200 parts by volume of dioxane at 70° C.

0.5 part by weight of the salt uses up 22.5 parts by volume of 0.1 N-silver nitrate solution, this corresponding to a molecular weight of 222.5 (calculated 219.5).

The picrate crystallises from alcohol in the form of orange-yellow needles having a melting point of 102° C.

$C_{10}H_{22}N_3 \cdot C_6H_2N_3O_7$ (412.24):

|  | C | H | N | O |
|---|---|---|---|---|
| Calculated percent | 46.6 | 5.9 | 20.4 | 27.1 |
| Found do | 46.2 | 5.7 | 20.5 | 26.9 |

EXAMPLE 5

3-Methylcyclohexylamino-2-Azaprop-2-En-1-Ylidene Methyl Cyclohexyl Ammonium Chloride

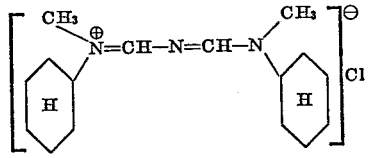

18.4 parts by weight of cyanuric chloride are dissolved in 113 parts by weight of N-methyl formyl cyclohexylamine and the resulting solution is heated. Evolution of carbon dioxide commences when the temperature reaches 40° C. A total of 3500 parts by volume of carbon dioxide have been evolved by the time the temperature has reached 120° C. The solution is allowed to stand overnight at 20° C. It is then diluted with 50 parts by volume of acetic ester and the crystals which form are filtered off with suction. After washing with acetone and drying in a desiccator, there are obtained 36 parts by weight of slightly hygroscopic colourless crystals melting at 115° C., the yield being 40% of the theoretical.

$C_{16}H_{10}ClN_3$ (299.72):

|  | C | H | Cl | N |
|---|---|---|---|---|
| Calculated percent | 63.9 | 10.0 | 11.8 | 14.0 |
| Found do | 62.4 | 10.0 | 11.9 | 13.5 |

The picrate crystallises from alcohol in the form of orange-yellow crystals having a melting point of 117° C.

$C_{16}H_{20}N_3 \cdot C_6H_3O_7$ (492.31):

|  | C | H | N | O |
|---|---|---|---|---|
| Calculated percent | 53.7 | 6.5 | 17.1 | 22.8 |
| Found do | 53.8 | 6.6 | 16.3 | 23.5 |

3-Methylbenzylamino-2-Azaprop-2-En-1-Ylidene-Methylbenzyl Ammonium Chloride

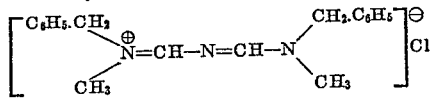

$C_{18}H_{22}N_3Cl$ (315.7).

This compound is obtained in similar manner and the salt melts at 147–152° C.

EXAMPLE 6

3-Pentamethylene-Amino-2-Azaprop-2-En-1-Ylidene Pentamethylene Ammonium Chloride

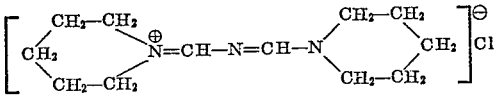

18.4 parts by weight of cyanuric chloride are dissolved in 91 parts by weight of formyl piperidine. On heating to 100° C., a violent and exothermic development of carbon dioxide is initiated. Evolution of carbon dioxide ceases after a few minutes. The temperature is maintained at 100° C. for 1 hour and 25 parts by volume of dioxane are then added. Crystallisation commences on cooling the reaction mixture to room temperature. After 2 hours, the substance is suction-filtered and washed with dioxane and then with acetic ester. After crystallising from dioxane, there are obtained 52 parts by weight of the salt, i.e. 72% of the theoretical, in the form of hygroscopic, light yellow crystals having a melting point of 124° C.

The picrate crystallises from alcohol in the form of yellow prisms having a melting point of 126° C.

$C_{12}H_{22}N_3 \cdot C_6H_2N_3O_7$, $C_{18}H_{24}N_6O_7$ (436.24):

|  | C | H | N | O |
|---|---|---|---|---|
| Calculated percent | 49.5 | 5.5 | 19.2 | 25.7 |
| Found do | 49.5 | 5.5 | 19.4 | 25.8 |

EXAMPLE 7

3-Tetramethylene-Amino-2-Azaprop-2-En-1-Ylidene Tetramethylene Ammonium Chloride

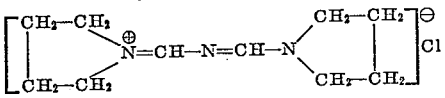

18.4 parts by weight of cyanuric chloride are dissolved in 80 parts by weight of formyl pyrrolidine. The reaction is exothermic. The temperature rises quickly to 50° C. and with violent evolution of carbon dioxide, in spite of cooling to 120° C. The evolution of carbon dioxide ceases after a few minutes. A total of 5800 parts by volume of carbon dioxide are formed, i.e. 86% of the theoretical. The crystal magma which forms on cooling the reaction mixture is diluted with a little dioxane. The crystals are suction-filtered and washed on the filter with acetone and acetic ester (1:1). In this way, 44 parts by weight of the salt are obtained, i.e. 68% of the theoretical. The salt is obtained in the form of yellowish crystals having a melting point of 142–145° C.

The picrate melts at 174–175° C. and crystallises from alcohol in the form of orange-yellow crystals.

$C_{10}H_{18}N_3 \cdot C_6H_2N_3O_7$ (408.21):

|  | C | H | N | O |
|---|---|---|---|---|
| Calculated percent | 47.0 | 5.0 | 20.6 | 27.4 |
| Found do | 46.7 | 5.0 | 20.6 | 27.9 |

EXAMPLE 8

36.9 parts by weight of cyanuric chloride are suspended in 150 parts by volume of ethylene chloride and 119 parts by weight of formyl pyrrolidine are added while stirring at 0–5° C. Carbon dioxide is evolved slowly and the temperature of the reaction mixture rises spontaneously to 10° C. The reaction mixture is maintained at a temperature of 15° C. for 1 hour. 54 parts by weight of primary adduct having a melting point of 148° C. (with decomposition) are thus obtained. The adduct is filtered off with suction.

75 parts by weight of formyl pyrrolidine can be recovered from the filtrate by distillation.

The primary adduct having a melting point of 148° C. is dissolved in formyl pyrrolidine at 80° C. with evolution of carbon dioxide. After dilution with dioxane, the salt having a melting point of 140° C. precipitates. The picrate melts at 171–172° C.

EXAMPLE 9

3- (3' - oxapentamethylene - amino) - 2 - azaprop - 2 - en-1 ylidene-3'-oxapentamethylene-ammonium chloride:

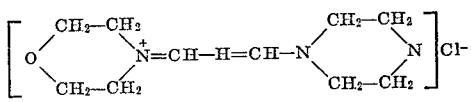

18.4 parts by weight of cyanuric chloride are dissolved in 90 parts by weight of N-formyl morpholine. After heating to 80–100° C., 5700 parts by volume of carbon dioxide are evolved in an exothermic reaction. After cooling, the dark oil is slowly diluted with acetone. The crystal magma which forms is filtered off with suction and washed with acetone. After drying in a desiccator, 50 parts by weight of the salt having a melting point of 154° C. are obtained, this being 67% of the theoretical.

The picrate crystallises from alcohol in the form of yellow prisms having a melting point of 154° C.

$C_{10}H_{18}N_3O_2 \cdot C_6H_2N_3O_7$ (440.21):

|  | C | H | N | O |
|---|---|---|---|---|
| Calculated...........percent.. | 43.5 | 4.6 | 19.0 | 32.8 |
| Found.....................do..... | 43.7 | 4.7 | 18.7 | 33.1 |

EXAMPLE 10

The N,N'-tetrasubstituted 3-amino-2-azaprop-2-en-1-ylidene ammonium halides obtained by the process according to the present invention can, in general, be used for the production of well known substituted triazines by reacting them with amidines thus for example benzamidine ($C_6H_5$—C($NH_2$)=NH) at elevated temperatures, advantageously without any solvent being present. The following example is a representative example of this general type of reaction.

120 parts by weight of benzamidine and 165 parts by weight of 3-dimethylamino-2-aza - prop-2-en-1-ylidene ammonium chloride are heated in admixture to 60° C. for 30 minutes whereby melting of the compounds occurs and then are heated to 90° C. for another 30 minutes. 22 parts by weight of dimethylamine are evolved during that time.

The oil obtained is poured into 400 parts by weight of water. 95 parts by weight of 2,4-diphenyl-1,3,5-triazine separate. Recrystallized from ethyl aclohol the compound melts at 76–77° C.

I claim:
1. A process for the preparation of N,N'-tetrasubstituted 3-amino-2-azaprop-2-en-1 - ylidine ammonium halides which comprises the steps of (1) reacting not less than 6 mols of a secondary N-formylamine having the formula

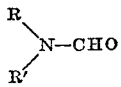

wherein R and R' each individually is selected from the group consisting of alkyl having 1–6 carbon atoms, cycloalkyl having 5–6 carbon atoms, benzyl and phenyl and when taken together constitute a member selected from the group consisting of 5 and 6 membered alkylene, oxyalkylene and thioalkylene bridges with 1 mol of a cyanuric halide selected from the group consisting of cyanuric chloride and cyanuric bromide at a temperature of from 0 to 180° C., and (2) recovering the N,N'-tetrasubstituted 3 - amino - 2-azaprop-2-en-1-ylidine ammonium halide thereby produced.

2. A process according to claim 1 which comprises effecting said reaction in the presence of an inert solvent selected from the group consisting of aromatic hydrocarbons and halogenated hydrocarbons.

3. A process for the preparation of N,N'-tetrasubstituted 3-amino-2-azaprop-2-en-1-ylidene ammonium halides which comprises the steps of (1) reacting not less than 2 mols of a secondary N-formyl amine having the formula

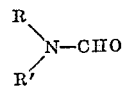

wherein R and R' each individually is selected from the group consisting of alkyl having 1–6 carbon atoms, cycloalkyl having 5–6 carbon atoms, benzyl and phenyl and when taken together constitute a member selected from the group consisting of 5 and 6 membered alkylene, oxyalkylene and thioalkylene bridges with 1 mol of a cyanuric halide selected from the group consisting of cyanuric chloride and cyanuric bromide at a temperature of from 0 to 10° C., (2) reacting the reaction mixture thus obtained with not less than 4 mols of a secondary N-formyl amine, as above defined, at a temperature of from 10 to 180° C., and (3) recovering the N,N'-tetrasubstituted 3 - amino - 2 - azaprop - 2 - en - 1 - ylidene ammonium halide thereby produced.

4. A process according to claim 3 which comprises recovering the reaction product of 1 mol of cyanuric halide with not less than 2 mols of secondary N-formyl amine from the reaction mixture obtained in the first step of the process, and employing said reaction product in the second step of the reaction.

5. A process for the preparation of 3-dimethylamino-2-azaprop-2-en-1-ylidene dimethyl ammonium chloride which comprises the steps of (1) reacting not less than 6 mols of dimethyl formamide with 1 mol of cyanuric chloride at a temperature of from about 20–80° C., and (2) recovering the 3-dimethylamino-2-azaprop-2 - en-1-ylidene dimethyl ammonium chloride thereby produced.

6. A process according to claim 5 which comprises effecting said reaction in the presence of benzene as solvent.

7. A process for the preparation of 3-dimethylamino-2-azaprop - 2 - en - 1 - ylidene dimethyl ammonium chloride which comprises the steps of (1) reacting not less than 2 mols of dimethyl formamide with 1 mol of cyanuric chloride at a temperature of about 5 to 10° C., (2) recovering the reaction product of 1 mol of cyanuric chloride and 2 mols of dimethyl formamide from the reaction mixture thus obtained, (3) reacting not less than 4 mols of dimethyl formamide with 1 mol of said reaction product at a temperature of about 80° C., and (4) recovering the 3-dimethylamino-2-azaprop-2-en-1-ylidene dimethyl ammonium chloride thereby produced.

8. An N,N'-tetrasubstituted 3-amino-2-azaprop-2-en-1-ylidene ammonium halide of the following formula

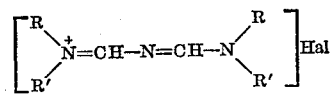

wherein R and R' each individually is selected from the group consisting of alkyl having 1–6 carbon atoms, cycloalkyl having 5–6 carbon atoms, benzyl and phenyl and when taken together constitute a member selected from the group consisting of 5 and 6 membered alkylene, oxyalkylene and thioalkylene bridges and Hal is a member selected from the group consisting of chlorine and bromine.

9. 3-methyl - phenylamino - 2 - azaprop-2-en-1-ylidene methyl phenyl ammonium chloride.

10. 3-methylcyclohexylamino-2-azaprop-2-en-1-ylidene methyl cyclohexyl ammonium chloride.

11. 3-tetramethylene - amino-2-azaprop-2-en-1-ylidene-tetramethylene ammonium chloride.

12. 3-(3'-oxapentamethylene - amino)-2-azaprop-2-en-1-ylidene-3'-oxapenta-methylene-ammonium chloride.

References Cited in the file of this patent

UNITED STATES PATENTS

| 1,897,428 | Hentrich et al. | Feb. 14, 1933 |
| 2,741,606 | Holt et al. | Apr. 10, 1956 |
| 2,849,451 | Hechenbleikner | Aug. 26, 1958 |
| 2,500,111, | Anish et al. | Mar. 7, 1960 |
| 3,055,939 | Cavallito et al. | Sept. 25, 1962 |

OTHER REFERENCES

Gold: Angewandte Chemie, vol. 72, pages 956 to 959, Dec. 21, 1960.

Smolin et al.: "s-Triazines and Derivatives," chapter II, pages 161 to 162 and page 182, Interscience Publishers, Inc., N.Y. (1959).

UNITED STATES PATENT OFFICE
CERTIFICATE OF CORRECTION

Patent No. 3,155,651                      November 3, 1964

Heinrich Gold

It is hereby certified that error appears in the above numbered patent requiring correction and that the said Letters Patent should read as corrected below.

Column 5, line 68, for "$C_{16}H_{20}N_3 \cdot C_6H_5O_7$" read -- $C_{16}H_{30}N_3 \cdot C_6H_3O_7$ --; column 7, lines 20 to 24, the formula should appear as shown below instead of as in the patent:

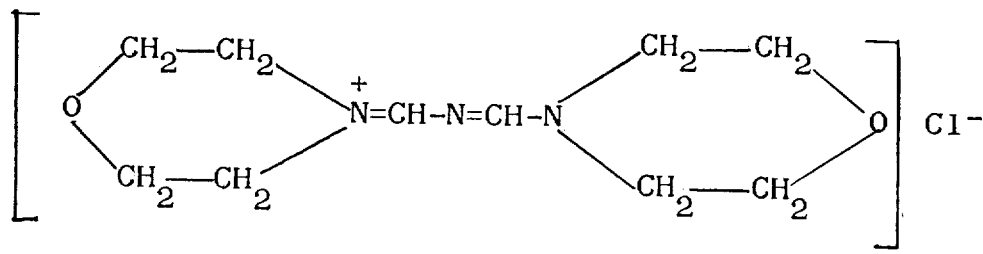

Signed and sealed this 6th day of April 1965.

(SEAL)
Attest:

ERNEST W. SWIDER
Attesting Officer

EDWARD J. BRENNER
                                     Commissioner of Patents